United States Patent [19]

Ishii

[11] Patent Number: 4,905,077
[45] Date of Patent: Feb. 27, 1990

[54] MULTI-SCENE DISPLAY SYSTEM
[75] Inventor: Tsuneo Ishii, Saitama, Japan
[73] Assignee: Pioneer Electronic Corporation, Tokyo, Japan
[21] Appl. No.: 154,391
[22] Filed: Feb. 10, 1988
[30] Foreign Application Priority Data Feb. 10, 1987 [JP] Japan .................. 62-28751

[51] Int. Cl.⁴ .............. H04N 5/262; H04N 5/222; H04N 9/74
[52] U.S. Cl. ..................... 358/22; 358/183; 358/335
[58] Field of Search ............ 358/22, 93, 108, 183, 358/185, 142, 146, 335, 310

[56] References Cited

U.S. PATENT DOCUMENTS

| 4,675,725 | 6/1987 | Parkyn | 358/183 |
| 4,680,643 | 7/1987 | Horiguchi | 358/183 |
| 4,729,028 | 3/1988 | Micic | 358/183 |
| 4,745,479 | 5/1988 | Waehner | 358/183 |
| 4,751,579 | 6/1988 | Okunishi | 358/183 |

FOREIGN PATENT DOCUMENTS

| 51171 | 5/1981 | Japan | 358/183 |
| 56154885 | 11/1981 | Japan . | |

*Primary Examiner*—Tommy P. Chin
*Attorney, Agent, or Firm*—Sughrue, Mion, Zinn, Macpeak & Seas

[57] ABSTRACT

Multi-scene display system for simultaneously displaying a plurality of scenes on a display screen, divides each scene into a plurality of regions and stores the scenes by regions. When displaying plural scenes on the display screen, the screen is divided into a number of parts equal to the number of scenes to be displayed and only the central regions of each scene displayed in a respective part of the display screen.

9 Claims, 3 Drawing Sheets

FIG. 3

MULTI-SCENE DISPLAY SYSTEM

BACKGROUND OF THE INVENTION

1. Field of the Invention

The present invention relates to a multi-scene display system in which a screen or other picture display panel, such as a television set or the like, is divided into a plurality of regions and different pictures are displayed in each of those regions.

2. Background

A technique in which a screen or other type of picture display panel is divided into a plurality of regions to display different pictures on the respective regions of the display at the same time has been proposed, for example, in Japanese Patent Unexamined Publication No. 56-154885. In that case, when a plurality of programs are recorded on a video tape, reduced size scenes are formed and the reduced scenes simultaneously displayed on one display screen. In this way the plural programs stored in the video tape can be easily recognized, the multi-picture display providing an index of the video tape contents.

In producing such reduced scenes, it is conventional, when sampling the normal picture information, to average that information. For example, when a reduced scene of a size which is 1/n of a normal scene is formed, picture data are thinned out by averaging the sampled data so that the reduced scene consists of compressed data representing the entire normal size scene.

In the case where the data are sampled as described above, however, a problem occurs in that the picture resolution deteriorates making the displayed picture rough, which deteriorates the viewing quality of the displayed scene. Furthermore, to perform such average sampling, it is necessary to use a frequency band limiting filter, a memory for storing newly formed compressed picture information, and so on. Accordingly, the structure becomes complicated and expensive.

SUMMARY OF THE INVENTION

It is therefore an object of the present invention to provide a multi-scene display system in which a multi-scene display can be formed without complicated structure.

It is another object of the present invention to provide a multi-scene display system in which a display screen of, for example, a television set, or the like, is divided into plural regions and the central regions only of plural scenes are simultaneously displayed on respective regions of the screen.

In order to attain the above objects, according to the present invention, the multi-scene display system is arranged so that each of a plurality of scenes are divided into a plurality of regions so as to enable only selected regions to be displayed. Picture information of the plural scenes are recorded on a recording medium. The picture information in substantially the central part of the regions of each of the plural scenes is simultaneously on a display screen.

Since each of the plurality of scenes is divided into a plurality of regions, the picture information in each scene is divided into portions corresponding to those regions. Picture information of the plurality of scenes is recorded on a recording medium, so that all the regions of one scene or only some of the regions of each scene can be displayed simultaneously on a single screen. When various pieces of picture information are simultaneously displayed on one and the same screen as a multi-scene, the picture information at substantially the central part of the regions of each of the plurality of scenes is used.

BRIEF DESCRIPTION OF THE DRAWINGS

FIGS. 2(a), 2(b), 3 and through 4 are views for explaining the picture scenes and memories.

DESCRIPTION OF PREFERRED EMBODIMENT

Figure 1:
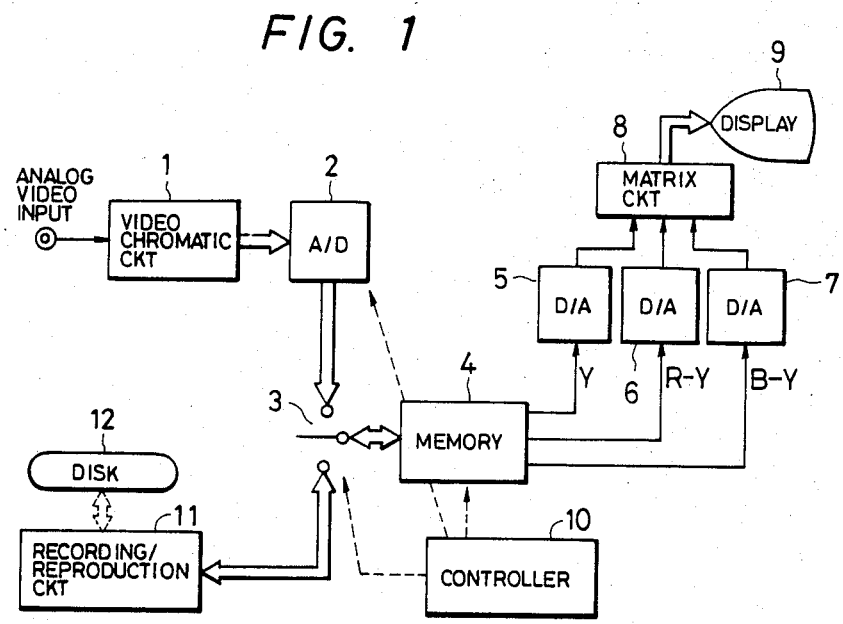
FIG. 1 is a block diagram showing a multi-scene display apparatus of the present invention.

FIG. 1 is a block diagram showing an embodiment of a multi-scene display apparatus according to the present invention. An analog video signal is supplied to a video chromatic circuit 1 and demodulated into a luminance signal Y, and color difference signal R-Y and B-Y. The luminance signal and the color difference signals are, respectively, converted into digital signals of, for example, 4 bits, through an A/D conversion circuit 2. Those digital signals are stored in a memory 4 through a switch 3 controlled by a controller 10.

Figure 2A:
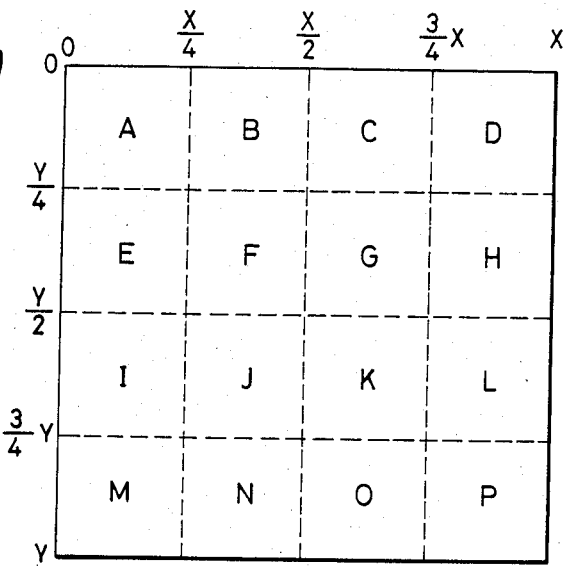
Figure 2B:
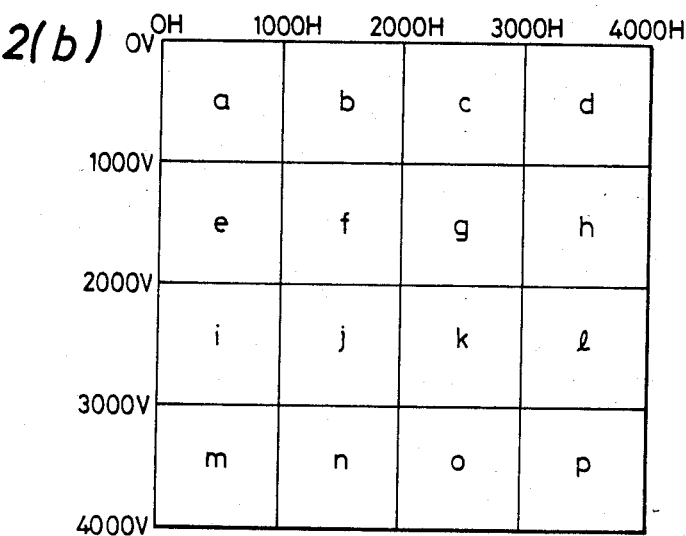

The memory 4 stores the respective data correspondingly to the various scenes. For example, as shown in FIG. 2(a), the display screen is divided into a plurality of regions. In this embodiment, the abscissa of length X is divided into $n_1$ parts ($n_1=4$) and the column of length Y is divided into $n_2$ parts ($n_2=4$). so that the display screen is divided into $n_1 n_2$ ($=16$) regions, A through P, as shown in the drawing. In the memory 4, the abscissa address (4000H) and the column address (4000V) are made to correspond to the abscissa X and the column Y of the display screen, respectively. Accordingly, the data in the regions A through P of the display screen are correspondingly, respectively, stored in areas a through p of the memory 4, so that the data can be read/written from/into the areas through p of the memory 4, area after area.

To this end, the controller 10 is arranged to generate an address for every area. For example when data are written/read into/from only the area f of the memory 4, the abscissa address is incremented one by one from the address (1000H, 1000V) to reach the address (2000H, 1000V), the column address is incremented by one to the address (1000H, 1001V), and then the abscissa address is incremented one by one again from the address (1000H, 1001V), etc.

When a predetermined command is applied to the controller 10, the data stored in memory 4 are read out and supplied to a recording/reproducing means 11. In the recording/reproducing means 11, the received data are stored in a memory (not shown) provided within the recording/reproducing means 11, subjected to predetermined processing, and then recorded on an optical disc 12 or the like.

Further, upon reception of another predetermined command, the controller 10 controls the recording/reproducing means 11 so as to reproduce the data recorded on the optical disc 12. The reproduced data are stored in the memory 4 through the switch 3.

Upon entry of a predetermined command from the controller 10, the data supplied from the A/D conversion circuit 2 or the recording/reproducing means 11, and stored in the memory 4 are read out from the memory 4. This data, corresponding to the luminance signal Y, the color-difference signal R-Y, and the color-difference signal B-Y of the data are supplied to D/A conversion circuits 5, 6, and 7, respectively. The D/A conversion circuits 5, 6, and 7 convert the supplied signals into analog signals, respectively, and the thus obtained analog signals are supplied to a matrix circuit 8. The matrix circuit 8 produces R, G and B signals from those supplied signals and supply those R, G and B signals together with the luminance signal Y to a display means 9, such as a CRT to display a picture.

As described above, all regions of each of various scenes are recorded/reproduced onto/from the optical disc 12.

Figure 3:
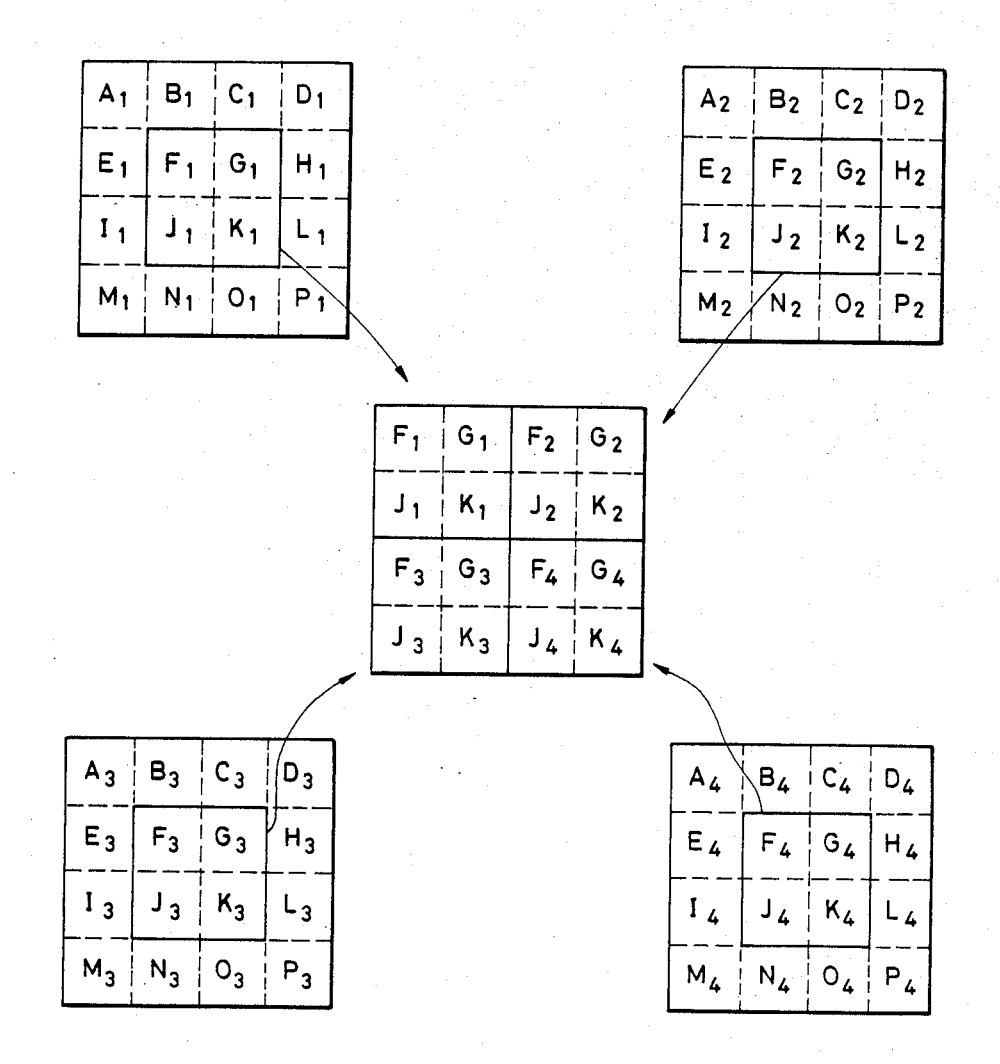

Upon reception of a command to display, for example, four sub-scenes of the data recorded as described above, the controller 10 controls the addressing of the memory 4 as shown in FIG. 3.

That is, only the data of the central regions $F_1$, $G_1$, $J_1$, and $K_1$ are separately extracted from the data of a first scene (a scene composed of the regions $A_1$ through $P_1$) received from the recording/reproducing means 11. The data of the regions $F_1$, $G_1$, $J_1$, and $K_1$ are stored in the areas a, b, c, and f of the memory 4, respectively. In a like manner, the data corresponding to four central regions $F_2$, $G_2$, $J_2$, and $K_2$ of a second scene composed of regions $A_2$ through $P_2$ are stored in the areas c, d, g, and h of the memory 4, respectively, and the data of four central regions $F_3$, $G_3$, $J_3$, and $K_3$ of a third scene composed of regions $A_3$ through $P_3$ are stored in the areas i, j, m, and n of the memory 4, and the data of four central regions $F_4$, $G_4$, $J_4$, and $K_4$ of a fourth scene composed of regions $A_4$ through $P_4$ are stored in the areas k, l, o, and p, respectively.

Thus, when the data stored in the memory 4 are displayed on the display means 9, the display screen is divided into four regions, and the central portions of four different pictures are multi-displayed in those four regions, respectively. Since only the substantially center regions of each of the four different scenes are displayed in a corresponding one of the four regions of the display means 9, the displayed scenes do not become rough and unclear as they do using average sampling to compress picture information. Further, since the most characteristic part of a scene is generally located at the central portion of the scene, it is possible to recognize the contents of the scene even when the peripheral portions of the scene are not displayed, so that the displayed scenes can provide sufficient information to give an index of the recording disc contents.

As described above, if the data of various scenes are stored in the memory 4 on the basis of the data supplied from the recording/reproducing means 11 or the A/D conversion circuit and then if the stored data are supplied to the recording/reproducing means 11 from the memory 4, picture information of the various scenes can be stored in the optical disc 12 as they were in the memory 4. Further, if the data is reproduced from the optical disc 12, the various scenes can be multi-displayed on the display means 9 without requiring any special addressing operation. Thus, if picture information of various scenes is previously stored so that a part of the regions (central regions) of each scene can be displayed, it is possible to shorten the time taken to display one multi-scene in comparison with the case where data in only a part of regions (central regions) of each scene are separated extracted and displayed, as described above.

Figure 4:
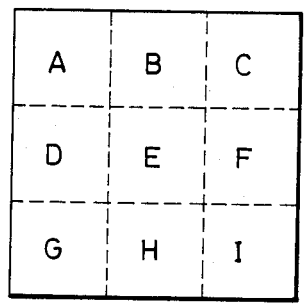

Although in the above description the display screen is divided into four regions, it will do to use any one of the regions F, G, J, and K of each scene as the central region of the scene in the case where the display screen is divided into 16 regions, and it will do to use the two regions F and G, or J and K of each scene as the central regions of the scene in the case where the screen of display is divided into 8 regions, as shown in FIG. 4, it will do to use the region E of each scene as the central region thereof.

The data composing one scene may be arranged on a optical disc 12 in accordance with the order of scanning, as is the case with video discs, video tapes, or the like, generally. When so arranged, for example, the data of the first lines of the respective regions A, B, C, and D are arranged in order, and then the data of the second lines of the respective regions A, B, C, and D are arranged in order. The data of the third lines et seq. are similarly arranged.

In such an arrangement, however, the addressing the optical disc 12 becomes complicated when the data in the respective regions A through P are read out. Therefore, the data may be arranged for every region separately, In that case, the data in the respective regions A through P are arranged so as to be stored in the first through 16th sectors, respectively. If the data are so arranged, data of any region can be rapidly reproduced merely by specifying the sector corresponding to the region.

In the multi-scene display system according to the present invention, each of a plurality of scenes are divided into a plurality of regions so that a part of the regions (central regions) can be displayed. Picture information of the plurality of scenes are recorded on a recording medium. The picture information corresponding to substantially the central part of the regions of each scene is simultaneously on a display screen. As a result, the structure is not complicated, and the cost is minimized. Further, scene resolution does not deteriorate.

What is claimed is:

1. A multi-scene display system, comprising:
    means for receiving a video signal representing a plurality of scenes;
    means for storing each of said scenes as a plurality of regions; and
    means for simultaneously displaying only selected regions of said plurality of scenes.

2. A multi-scene display system as claimed in claim 1, wherein said means for simultaneously displaying includes means for simultaneously displaying only the central regions of said plurality of scenes.

3. A multi-scene display system as claimed in claim 1, further includes;
    a video recording medium;
    a recording/reproducing means for recording all the regions of said plurality of scenes on said video recording medium and for reproducing the recorded regions; and
    controller means for selecting for display only central regions of a plurality of said reproduced regions corresponding to said plurality of scenes; and
    said means for simultaneously displaying includes display means for simultaneously displaying said selected central regions of a plurality of said regions.

4. A multi-scene display system as claimed in claim 3, wherein; said video signal receiving means includes a video chromatic circuit means for producing, in response to said video signal, luminance and color difference signals representing the plurality of scenes conveyed by the video signal, and analog to digital conversion means, responsive to the output of said video chromatic circuit means, for producing digital signals representative of said plurality of scenes to be applied to said storing means; said multi-scene display system further including switch means for selectively applying to said storing means signals representing at least one scene or selected scene regions reproduced from said video recording medium.

5. A multi-scene display system as claimed in claim 4, wherein said controller means includes means for placing said switch means in a selected state.

6. A multi-scene display system as claimed in claim 5, wherein said display means includes digital to analog conversion means, coupled to said storing means for converting digital signals representing regions read out of said storing means into analog luminance and color difference signals, a matrix circuit receiving the outputs of the digital to analog conversion means, and a display coupled to the matrix circuit.

7. A multi-scene display system as claimed in claim 6, wherein said video recording medium stores together the selected central regions of said plurality of regions corresponding to said plurality of scenes, whereby the together stored central regions can be reproduced quickly and rapidly displayed simultaneously.

8. A multi-scene display system comprising:
- a video chromatic circuit means for receiving an analog video signal and outputting a luminance signal and color difference signals corresponding to the picture information contained in the analog video signal, said picture information representing a plurality of scenes;
- an analog to digital conversion means for converting said luminance and color difference signals to digital signals representing said picture information;
- memory means for storing the picture information corresponding to a scene in a plurality of defined regions;
- controller means for controlling the writing into and reading out of said memory means;
- a video recording medium for storing said plurality of scenes;
- a recording/reproducing means responsive to said controller for recording the picture information of defined regions of each of said plurality of scenes read from said memory means on said video recording medium;
- a video display means; and
- means, responsive to said controller and coupled to said memory means, for simultaneously displaying on said video display means only selected regions of said plurality of scenes.

9. A multi-scene display system as claimed in claim 8, wherein said means for simultaneously displaying displays only the central regions of said plurality of scenes.

* * * * *